(12) United States Patent
Wang

(10) Patent No.: US 6,241,375 B1
(45) Date of Patent: Jun. 5, 2001

(54) SHEAR RING SCREW

(75) Inventor: Peter Naiyi Wang, Rutherford, NJ (US)

(73) Assignee: Peter Wang, Rutherford, NJ (US)

( * ) Notice: Subject to any disclaimer, the term of this patent is extended or adjusted under 35 U.S.C. 154(b) by 0 days.

(21) Appl. No.: 09/127,513

(22) Filed: Aug. 1, 1998

(51) Int. Cl.$^7$ .................................................. B29B 7/42
(52) U.S. Cl. ................................................................ 366/82
(58) Field of Search ................................ 366/79, 80, 81, 366/82, 87, 89, 90

(56) References Cited

U.S. PATENT DOCUMENTS

| | | | |
|---|---|---|---|
| 2,817,876 | * 12/1957 | Gandelli et al. | 366/82 |
| 3,676,034 | * 7/1972 | Wendricks | 366/80 |
| 3,751,015 | * 8/1973 | Hensen et al. | 366/81 |
| 4,151,242 | * 4/1979 | Sansone | 366/81 |
| 4,447,156 | * 5/1984 | Csongor | 366/82 |
| 4,659,230 | * 4/1987 | Son et al. | 366/81 |
| 4,723,901 | * 2/1988 | Saramaru | 366/80 |
| 5,129,729 | * 7/1992 | Geyer | 366/90 |
| 5,158,784 | * 10/1992 | Semmekrot | 366/82 |
| 5,573,331 | * 11/1996 | Lin | 366/81 |

FOREIGN PATENT DOCUMENTS

1007140 * 10/1965 (GB) ................................ 366/89

* cited by examiner

Primary Examiner—Tony G. Soohoo
(74) Attorney, Agent, or Firm—Rosenman & Colin LLP

(57) ABSTRACT

A shear ring screw adopted for use with polymer extrusion or injection molding machinery including a first stage feeding portion (26), a second stage ring section (28) and a third stage tip section (44B). It would be generally aimed at improving the melting, dispersing and spatial distributive mixing action of such machinery. This would be generally achieved through the use of shear rings with a series of angled ports or holes. The ring section disperses fillers or additives by powerful shearing and stretching force created by relative ring to ring and ring to screw movements. The molten mixture could be further mixed and homogenized by the tube tip section which have plural of port members on radial directions and a conical shaped flow channel in axial direction.

18 Claims, 6 Drawing Sheets

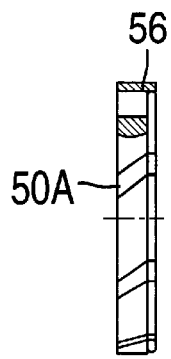 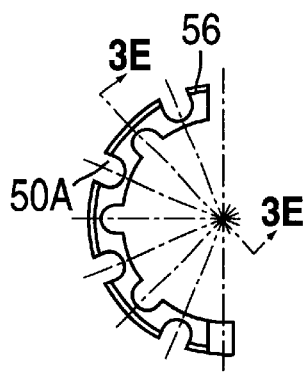 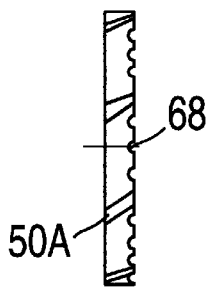 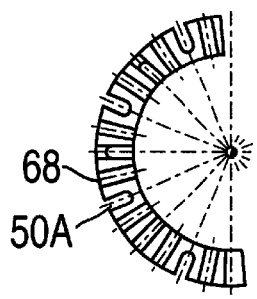
FIG. 3E     FIG. 3F     FIG. 3G     FIG. 3H
  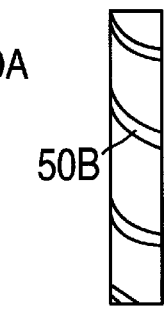 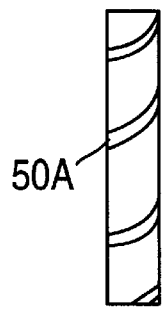 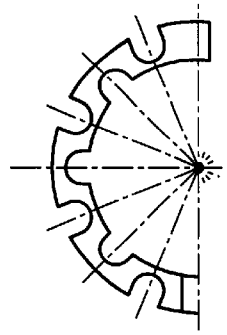
FIG. 3I    FIG. 3J    FIG. 3K    FIG. 3L    FIG. 3M
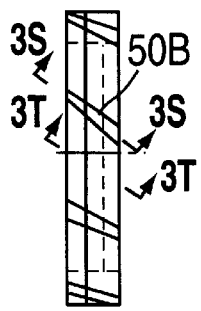 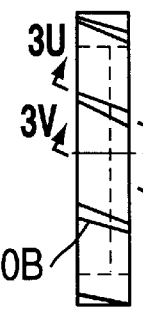 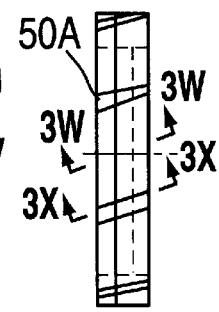 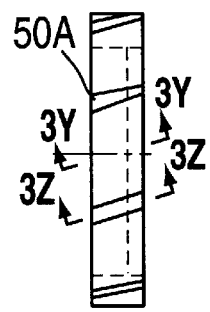 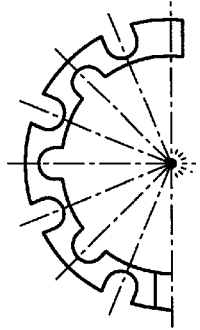
FIG. 3N    FIG. 3O    FIG. 3P    FIG. 3Q    FIG. 3R
            
FIG. 3S    FIG. 3U    FIG. 3W    FIG. 3Y
            
FIG. 3T    FIG. 3V    FIG. 3X    FIG. 3Z

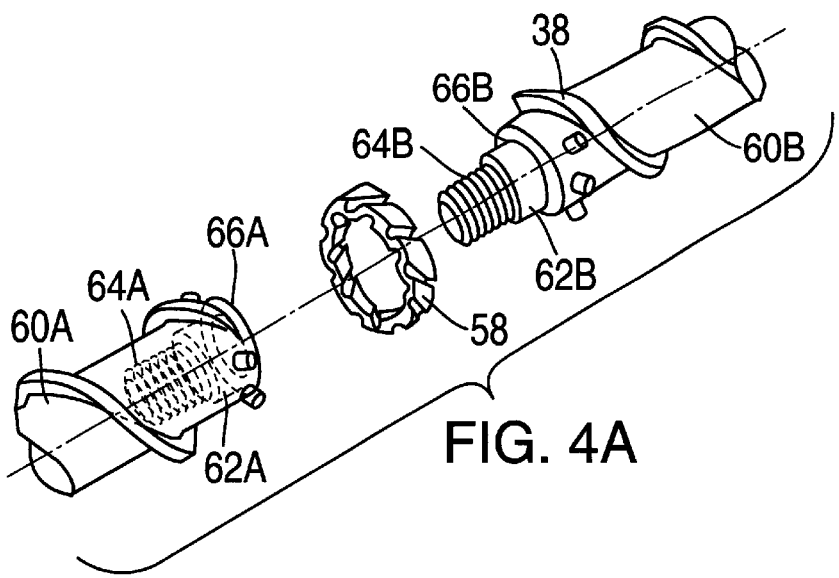
FIG. 4A
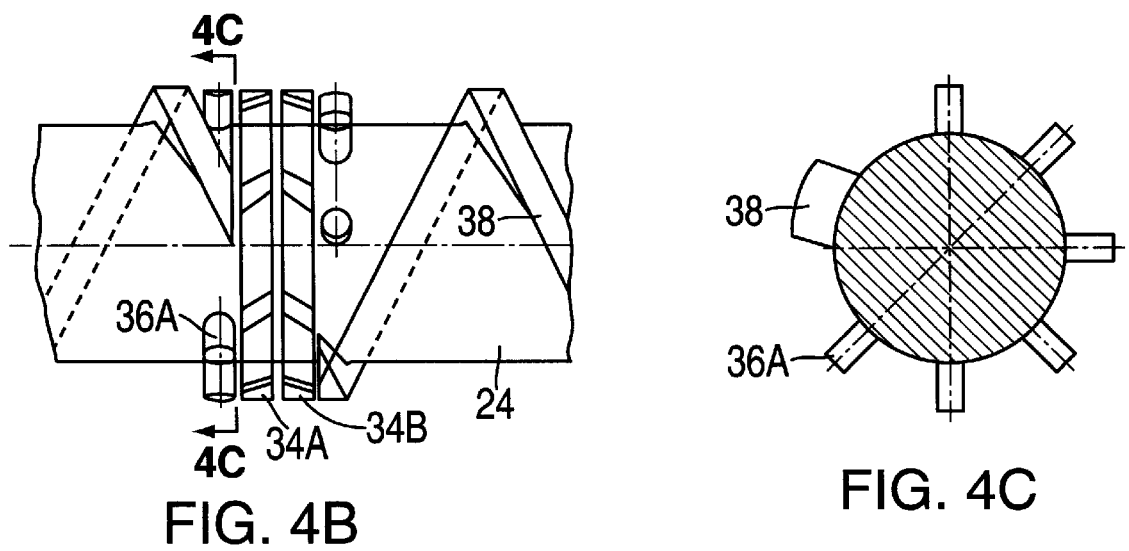
FIG. 4B
FIG. 4C
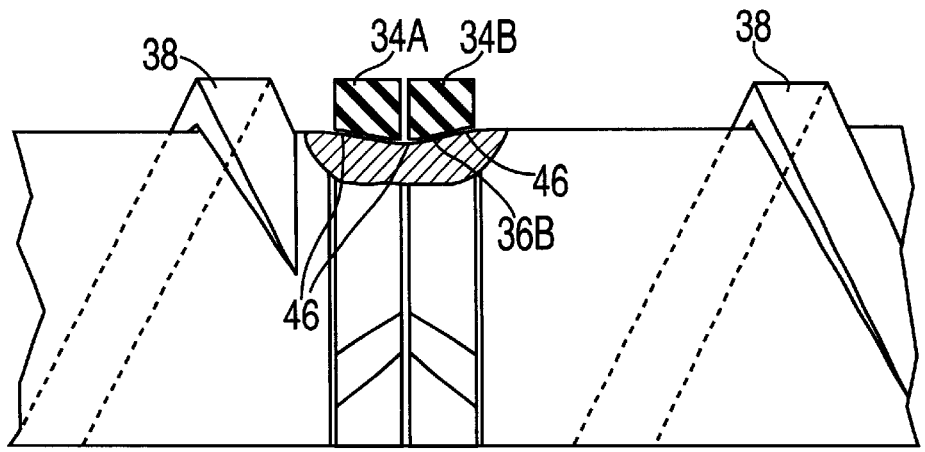
FIG. 4D

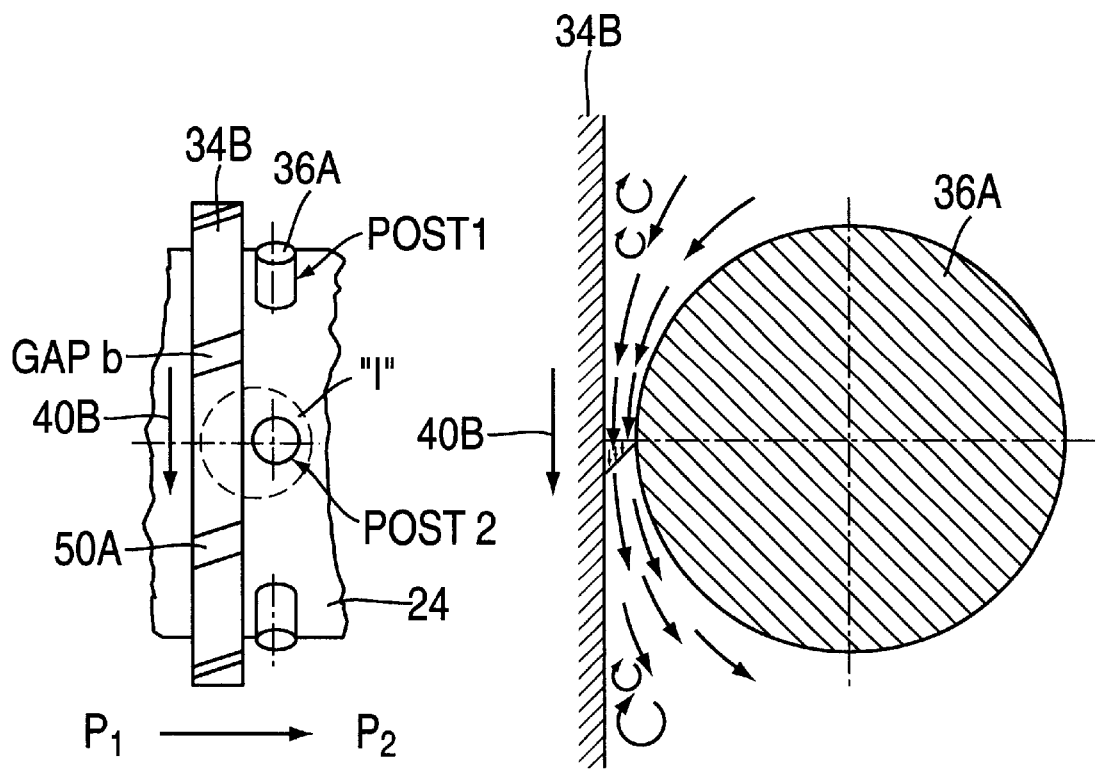
GAP b
PLASTIC FLOW DIRECTION
FIG. 5A
ENLARGE VIEW ON "I"
FIG. 5B
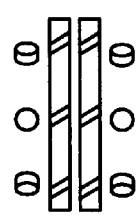
FIG. 6A
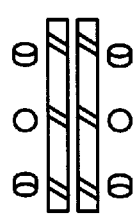
FIG. 6B
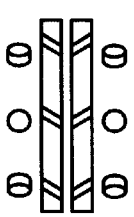
FIG. 6C
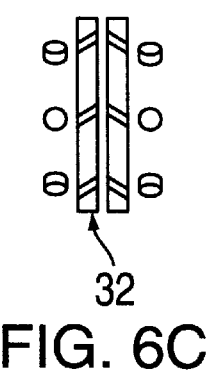
FIG. 6C
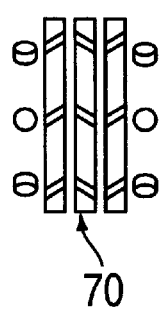
FIG. 6D

SHEAR RING SCREW

BACKGROUND OF THE INVENTION

The present invention relates to a single screw for polymer extrusion or injection-molding process, which provides enhanced melting and mixing performance.

Efforts aimed at improving melting and mixing action on single screw polymer extrusion and injection molding can be traced back as early as 1950's. The inherent shortcoming of single screw extrusion is that it is under the so called "laminar segregated melting mechanism". Compare to so-called "mix-melting mechanism" (examples of processes under later mechanism are internal batch mixer and twin-screw extruder), single-screw extrusion does not provide strong and uniform shear. It is this shortcoming which causes less efficient melting and poor mixing in compounding process. In the case of polymer-polymer or plastic-rubber blending processes, single-screw extrusion will not be able to provide the benefit of so called "phase inversion", a rate process discovered and defined by Chi-Kai Shih, DuPont Company, Inc., Wilmington, Del. (Ref. To "Plastics Engineering" June 1998, p.49).

Among the total five elementary steps (solid conveying, melting, mixing, pressurization and die forming), mixing and melting are the two slowest elementary steps. To get higher production and better quality, improved melting and mixing are a must. That is why tremendous efforts have been and will be invested into this field.

To get more efficient melting and mixing the key word here is shear, which is because:

A. shear energy can dissipate to heat energy (by "internal friction") thus melting the plastic;

B. shear stress can break down the particle size of the filler (or in general the other phase), i.e., disperse mixing;

C. shear strain or deformation, comes with shear stress, is essential to distributive mixing.

Many patented and non-patented pin type, ring type, disc type, multiple-flight type, cavity type, barrier type, thin gap type and kneading type mixing screws or screw elements have been invented. Every type has it's own advantages and disadvantages. U.S. Pat. No. 4,652,138, to Inoue, etc. 1987, used two stage kneading portions, with the first stage disperses the filler into polymer by a strong shearing force, second stage blends and disperses the filler further by using the cavities in its rotor and stator. The so-called stator is actually a section of screw barrel which has cavities made inside of it. Although substantial improvement on mixing is expected, but undesired trapping of plastic melt in "dead spaces" may arise. Also its manufacture cost is high and can not be adopted to popular single screw barrel system.

U.S. Pat. No. 4,367,190, to Shirlay Beach, (1983), discloses using toothed rings as valve means on up stream and staggered arranged rows of pins on down stream to improve mixing on cable coating extrusion process. Similar design can be found in U.S. Pat. No. 4,015,833, to Heung Tai Kim, (1975), use shear rings with fins, and U.S. Pat. No. 4,103,353, to Timothy Stephen Dougherty, etc. (1976), using pins arranged in a ring pattern installed on certain sections of screw. The basic principle of above designs is to create tortuous path for plastic melt to go through thus enhance distributive mixing. Since these kind of designs have all of their mixing means fixed on the screw, their shear strength for mixing are limited.

U.S. Pat. No. 4,154,536, to N. Sokolow, (1979), discloses installing segmental mixing element to screw. This element is made of circumferentially interrupted helical flights. Further more, those screw flights has inclined ramps on the leading ends. This structure can increase solid bed shearing and conductive heating surface areas and thus enhance melting rate. In down stream barrier rings with advancing and reversing flights provide more shearing force to molten plastic, thus enhanced mixing. The weakness of this design is that, (a) It's not a easy job to make this screw, which means the tooling cost could be high; (b) Shear action may not uniform; (c) Too many broken flights may weaken the conveying strength too much, which means loosing on throughput.

Though a lot of efforts have been putting in, but "The truth is that there have been no major technology break through in screw design for last 30 years", indicated by a keynote speaker Robert Barr, President of Robert Barr Inc., Virginia Beach, Va., at ANTEC '98 Conference in Atlanta. He also envisions the next generation of screw designs as providing enhanced mixing and will be focussed on in-barrel melting and mixing (Ref. To: "Modern Plastics" July 1998, p.79). The shear ring screw will certainly help on above respects.

BRIEF SUMMARY OF THE INVENTION

The main function of shear ring is to provide the shear needed for more efficient melting and mixing. Several objects and advantages of the current invention are:

(a) to provide intensive shear uniformly spread to the whole system by renewing the shearing surface constantly. The ununiform shearing or "laminar segregated melting mechanism" is so far the most reason why the single-screw extrusion was less efficient than twin-screw extrusion. Shear ring screw is going to make a change on this not preferred situation;

(b) to provide intensive shear that allow the expose to high stress occurs only for a short period of time, which makes the process more efficient and less chance to get degradation. Further benefit of this feature is to avoid other problems could be caused by over shearing, such as re-agglomerate, chemical changes, molecule ramification branch changes, etc.;

(c) to provide intensive shear and the strength of shear can be adjusted easily in a vast range. The reason we need shear level adjustable in a wide range is because too low a shear stress will not break agglomerate and too high will degrade the plastic (so called "burning"). A further reason is that different filler has different yield stress, so that a selectable range of shear strength is requested in order to get optimum result when filler or base resins changes. An example is a color concentrate manufacture, different pigment agglomerates need to be dispersed below certain critical sizes.

(d) to provide intensive shear in the position you need along screw axis and that position can be changed easily. This feature is not usually found in prior arts. The benefit of this feature can be appreciated when switch one base material to another, one filler or additive to another, and one feeding option to another, etc.;

(e) to provide intensive shear in a pattern that interrupt and re-organize flow stream lines vigorously, helping distributive mixing, which means homogenized extrudate. This benefit will appear more when a product demands dimension accuracy, such as sheet or profile extrusion, precision molding, etc.;

(f) to provide complete barrel surface wiping action, which means self cleaning, no "dead corners";

(g) optional tube tip element offers surface renewal enhanced distributive mixing and stream kneading actions, which may especially benefit the Phase Inversion step and post Phase Inversion step, a rate process defined by Chi-Kai Shih, DuPont Company, Inc., Wilmington, Del. (Ref. To: ANTEC 1991 Conference proceedings, p99), in polymer blending process. The variations of the tip design could be a means of controlling droplet breakup/coalescence rates, extent of cross linking and in-situ grafting, etc, which are important to the properties of final products. It will also benefit in-barrel colorants, liquid additives, oils and tackifiers mixing, which are foreseeable booming markets as identified by Robert Barr, President of Robert Barr Inc., Virginia Beach, Va. (Ref. To: "Modern Plastics", July 1998, p79).

(h) the design is simple, low cost on tooling, no special tools are required, easy to set up, which means short investment-profit cycle;

(i) the design can be easily adopted to most popular extruders and injection molding machines, without changing barrel, die (or nozzle), heating, cooling, power supply, controlling system, etc . . .

Further objects and advantages are to provide the manufacture a possibility to be able to switch from twin-screw extruder to single screw extruder for jobs were not possible be done in a single screw extruder before, which means a cost reduction of up to 50%; to provide the opportunity to meet the challenge of new formulas, higher percentage of filler or additive down load and new products, which means more new customers; to increase productivity by a large scale, or even more than double for those currently terribly operated extrusion lines, especially those big diameter extruders, which means savings on machine hour and labor cost. Still further objects and advantages will become apparent from a consideration of the ensuing description and drawings.

BRIEF DESCRIPTION OF THE SEVERAL VIEWS OF THE DRAWING

In the drawings, closely related figures have the same number but different alphabetic suffixes.

DETAILED DESCRIPTION OF THE INVENTION

Figure 1:
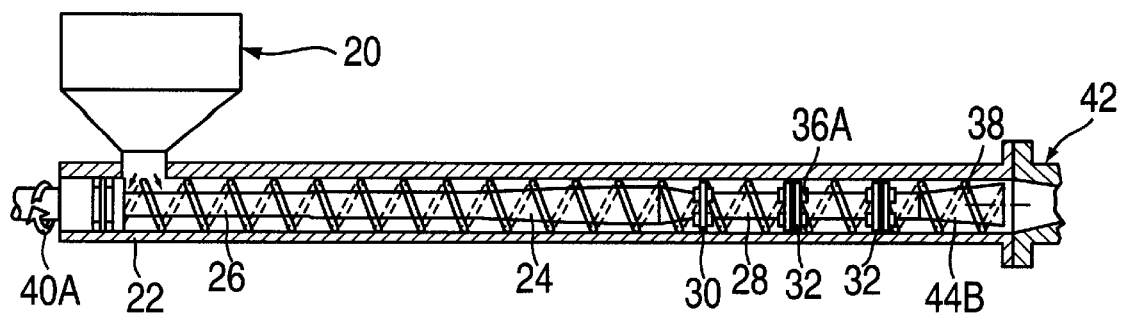
FIG. 1 Over view on a shear ring screw in an extruder or an injection molding machine FIG. 2A A detail view on shear ring section with optional metering tip and groove type ring position limitation means FIG. 2B A detail view on shear ring section with optional tube tip and post type ring position limitation means FIG. 3A Ring half—left hand rotating FIG. 3B Ring half—right hand rotating FIG. 3C Ring has controlled ring-to-ring gap means FIG. 3D Ring has grinding groove means on shearing surfaces FIG. 3E More shapes on shear rings FIG. 3F One piece ring with segmental screw assembly FIG. 4A Ring position limitation means-post type FIG. 4B Ring position limitation means-groove type FIG. 5 Flow pattern between shear ring and ring position limitation posts FIG. 6 Combination options on rings and posts FIG. 7 Spatial distributive means on tube tip FIG. 8 Mid- or down-stream feeding option FIG. 9A shear ring tip element FIG. 9B tube tip element
Figure 2A:
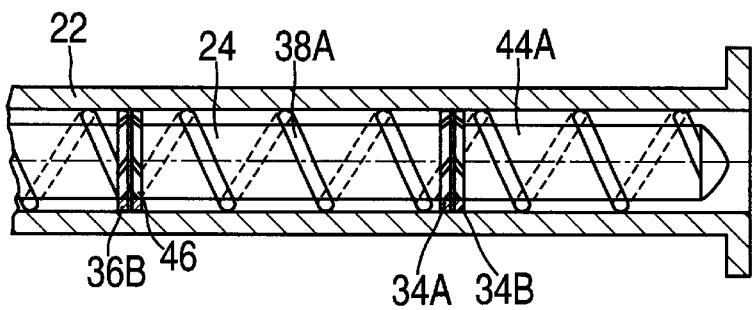
Figure 2B:
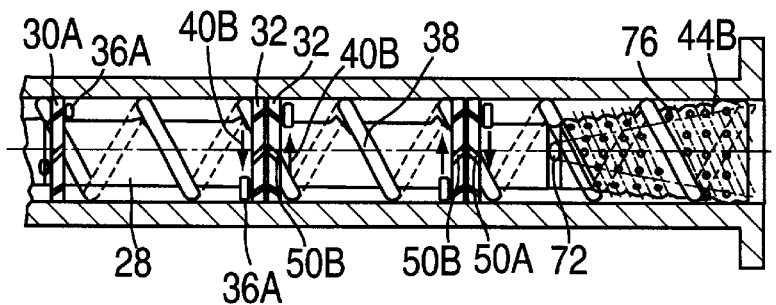

A typical embodiment of the present invention is illustrated in FIG. 1 (over view) and FIGS. 2A, 2B (detail views).

The solid plastic pellets (or powder) pre-mixed with filler (or additive) feed in through a hopper 20, mounted on a barrel 22, has gradually melted on it's way of flowing to down stream of a screw 24. Feeding portion 26 is a ring section 28. Depend on specific application, ring section could include plural of shear ring units. A shear ring unit could be one of following: a single-ring unit 30, a double-ring unit 32, or a Multi-ring unit 70 (best shown in FIG. 6). The single-ring unit has one ring. It could be made as half-half or one piece; could be right hand rotating with a right hand rotating flow through means 50A (FIG. 3A) or left hand rotating with a left hand rotating flow through means 50B (FIG. 3B); could be screw axis position limited by a post type means 36A (FIG. 2B) or a groove type means 36B (FIG. 4B). Double-ring unit has two rings, an up-stream ring 34A and a down-stream ring 34B. They could be arranged either rotate in the same direction or opposite direction. Each of the two could be made as half-half or one piece, The Multi-ring unit has more than two rings. Each ring of which could be made as half-half or one piece; left hand or right hand rotating, and the position limitation means could be either post type or groove type. Rings from different units are inter-changeable.

When material flowing through the single shear ring unit, the relative movement between the ring position limitation posts and the shear ring create a cutting and stretching action. The softened partially melted mixture of plastic and filler (or additive) will be cut to small regular sized pieces.

When material flowing through the double-ring or the Multi-ring unit, the mixture of plastic melt and filler (or additive) will be sheared in the clearance between rings, as well as between the posts and the rings. Depend on the shear level desired, material used, operating conditions and specific requirements of the product, there could be less or more of different shear ring units in ring section 28. After the melt left the ring section they either be stabilized by few turns of a metering tip 44A (FIG. 2A) or further homogenized/spatially distributed through tube tip 44B (FIG. 2B), or one way conveyed by check ring tip (not shown, for injection molding).

Figure 7:
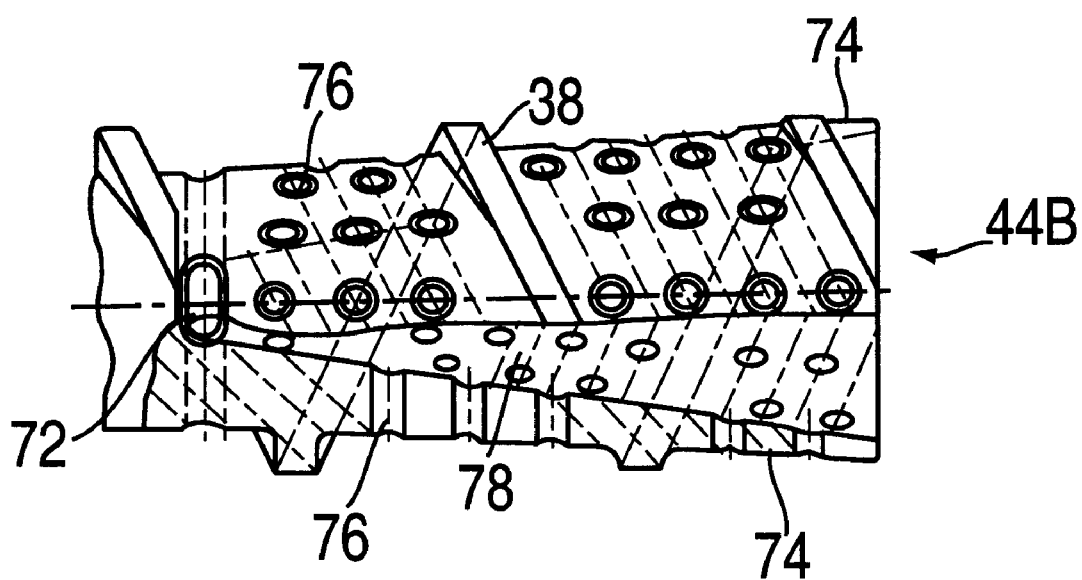

Tube tip 44B has a conical shape, best shown in FIG. 7, which makes a screw channel at the end of the tube tip 74 very shallow. This shape will create a squeezing force to push melt flow through rows of radial oriented spatial distribution means 76, which actually divide the flow in screw channel from one stream to plural of streams. Meanwhile the flow changes its direction by 90 degrees. The divided stream will be combined to one stream as they further flow into a screw axial oriented flow stream combination means 78, Meanwhile the flow changes it's direction by another 90 degrees. The melt collected in the flow stream combination means will move forward to a die or a nozzle 42, and passes through such a die (or nozzle) to make the finished plastic product.

The screw axis location of ring section 28 as well as the lay out of the ring section could be decided by computer extrusion processing simulation or empirical based methods. Usually we may put the starting point of the ring section at the place where the content is at its physical state of the ending of stage II and the starting of stage III, as defined by Chi-Kai Shih, "Fundamentals of Polymer Compounding—Part II: Simulation of Polymer Compounding Process", ANTEC 1991 Conference proceedings, p99; or the ending point of delay zone and the starting point of melting zone, as defined by Z. Tadmor, Imrich Klein "Engineering Principles of Plasticating Extrusion" Robert E Krieger Publishing Company, Inc. 1970

Figure 3A:
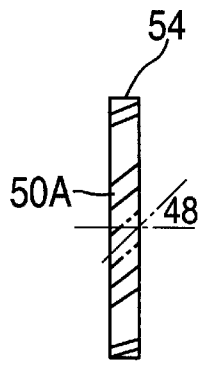
Figure 3B:
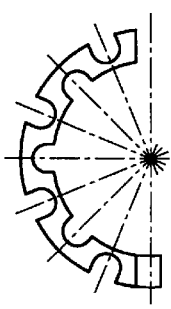

FIGS. 3A and 3B show a sample ring made as half-half structure. Each ring half has seven gaps, three of which have openings inward and four of which have openings outward. Openings on both inside diameter and outside diameter can help the screw self-cleaning. More gaps per ring half will divide plastic flow to more streams, which is good for distributive mixing. But too many gaps make manufacture cost higher and less mechanical strength of the ring.

There are three dimensions on a ring need to be noticed, they are cutting angle of flow through means 48, cutting width of flow through means 52 and ring thickness 54.

The sample rings shown in FIGS. 3A and 3B have flow through means cut in an angle of 45° to screw axis. Those angled gaps will create a torque when the mixture of plastic melt and filler (or additives) flows through those gaps, which makes the rings 34 rotate relative to screw 24. Although the theoretical optimums angle (to give maximum dispersive mixing) of shearing force direction against stream flow direction is 45° (or 135°), but other factors also need to be concerned. For example, rotating speed (thus the shearing level) of the ring will be very much related to this angle. Also, how viscous is the plastic melt, how ridged is the filler's agglomerate, how high is the throughput, etc., are factors playing roles when make a design decision on this angle.

The flow through gap cutting width gives us a window to adjust the shear strength. If we want low shear strength and low resistance on flow stream, we need choose a wider cutting width to make the flow through area bigger and the effective shear surface smaller, which means weaker of the shearing. If a strong shear is desired, just do it in an opposite way, i.e., make the cutting width narrower. Note that the shape of those flow through means does not have to be cut straight. More sample shapes can be found in FIG. 3E.

Ring thickness 54 (FIGS. 3A and 3B) affects the strength of the torque inserting on the ring as well as ring-to-ring clearance or ring-to-pole clearance. Since we will not usually move ring position limitation posts after they are installed, then by changing a thinner or thicker ring we can make the ring-to-ring or ring-to-post clearance bigger or smaller. These two clearances directly effect shear strength and overall screw channel flowing resistance. Further, a thicker ring gives a stronger ring rotating driving force or torque. So, this ring thickness is a sensitive dimension.

There are two types of ring-to-ring or ring-to-post clearance control, floating control and positive control.

1. Floating ring-to-ring or ring-to-post clearance

The ring structure shown in FIGS. 3A and 3B will have a floating ring-to-ring or ring-to-post clearance. Experiments and lubrication theory show that there will be a clearance between the two rings, which is a function of the over all balance of the pressure, flow speed, viscosity of the plastic melt, etc . . . This kind of operation can offer advanced dynamic stabilization feature to the system, which leads to a more stable extrusion or injection molding. For example, refer to FIG. 5, when upper stream pressure is fluctuate higher by any reason, that pressure will push the up-stream ring toward to down-stream which makes the ring to ring or ring to post clearance smaller. A smaller clearance will cause more pressure drop, thus the pressure at down-stream will become lower, which means that pressure higher fluctuate has been damped out. When if the up-stream pressure fluctuate lower, the clearance and pressure drop will go the other way around. What happen is that the rings may keep moving back and forth among position limitation means, the overall result is a well-balanced steady processing.

2. Controlled ring-to-ring or ring-to-post clearance

Figure 3C:
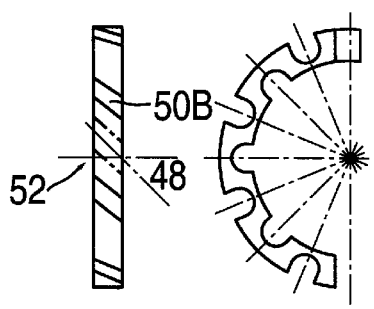

Some application may require a safeguard for not allowing the shear strength to go over certain level, e.g. PVC processing. A positive control on ring-to-ring or ring-to-post clearance will meet this need. FIG. 3C shows a ring structure can control those clearances. This design adds a wedge shaped protrusion on the shearing surface. This wedge thus controls the minimum clearance.

Figure 3D:
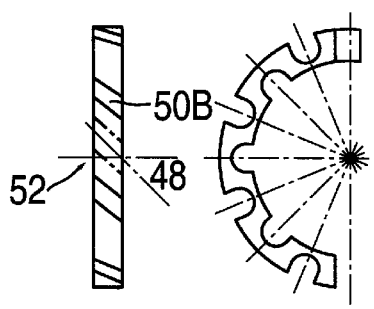

For fiber reinforced applications we may want to put grooves on ring's shearing surfaces, as shown in FIG. 3D. The sample drawing shows half round grooves added on every intervals of inward and outward flow through means. The purpose of those grooves are, not limited to, to improve fiber orientations, to grind filler agglomerates, and to provide a connecting channel between the inward and outward gap openings for more distributive mixing, etc.

FIG. 3E shows sample designs on angled flow through means; optional shapes on shearing surface and optional ring cross sectional shapes.

FIG. 3F shows rings made as one piece with screw segmental assembled. The benefits of half-half ring structure are lower tooling cost (because it does not require segmental assembly of the screw), and convenient for ring changing. The benefit of one-piece ring design is that the ring is strong, and meets some tool maker or processor's preference.

FIG. 4A shows the layout of the post type of ring position limitation means. Number of posts mounted on one screw cross section could vary for different applications, such as screw sizes. For a medium sized screw six poles make a typical row of ring position limitation posts.

FIG. 4B shows the layout of the groove type of ring position limitation means. The rings will be pivotally seated on the slots cut in the flight and groove cut on the screw root. The benefit of groove type is lower cost for tooling. Instead of shearing in between ring and posts, as what happened in post type structure, materials are sheared in between of the ring and a screw flight 38 cross cutting surfaces. Note that pluralities of radius 46, as shown in FIG. 4B, are important. Those radius help to make the groove surface stream line shaped avoiding dead space or sharp corners. Further note that this groove type design can be used to modify existing screws to shear ring screws without touching screw heat treatment and other existing finishes.

FIG. 5 shows a physical model on what happening in between shear ring and ring position limitation posts. Refer to FIG. 5, look at flow through gap b. In time period Δt gap b will move from post 1 to post 2. A chunk of plastic melt and filler mixture will flow out from that gap in that period of time, and ready to hit post 2. Then this chunk of mixture will be stretched, squeezed, pressurized and sheared through that wedged clearance between the ring surface and the pole. It is believed that other than shear stress, elongation stresses (such as stretching and squeezing stresses) are also important to dispersive mixing. The pressure on up-stream side of the ring, P1, balances the pressure created in that wedged clearance. By making a lubrication assumption, this flow can be computer simulated and solved, which gives the velocity profile, pressure profile, stress distribution, distance between the ring surface and the post, etc. If the screw speed is high, and the material is not too thin, that shearing, stretching, squeezing and pressurizing force could be fairly big. It is these shearing, squeezing and pressurizing forces break the agglomerates.

FIG. 6 shows the possible combination options on the ring units and the posts. For example, if we have two kind of rings, e.g. +45°/−45° flow through gaps, and every ring has two positions available—up-stream and down-stream, then there will be total FOUR ($4 = 2^2$) different combinations on this double-ring unit layout. If we have three ring angles, e.g. +45°/−45°/+15°, and every ring has two places available— up-stream and down-stream, then there will be total nine ($9=3^2$) different combinations on this double-ring layout. If every ring has three places available—up-stream, middle-stream and down-stream, then there will be total twenty seven ($27=3^3$) different combinations on this multi-ring unit. Furthermore, if the ring position limitation posts be put in middle of rings, then the possible combinations for this three ring unit is eighty one ($81=3^4$).

FIG. 7 shows the detailed structure on tube tip. The purpose of the optional tube tip is to enhance spatial distributive mixing. There are four slot holes located at the starting point of the tubs section with 90° apart from each other, which we call them as a radial flow through means at starting point of tube tip 44B. Those four slot holes establish the very beginning of tube tip 44B. It's important to make the four holes at the very beginning of the axial oriented stream combination means to assure self-cleaning feature. Following the four slot holes are uniformly distributed radial oriented spatial distribution apertures 76.

Here are three design high lights for tube section.

1. Flow stream dividing/combining and shooting against each other

One of the purposes of tube section is that it divides the melt to streams and then leads them shooting against each other from all directions in high speeds and high pressure. The kneading, shearing, stream line re-organizing, position interchange and surface renewal functions are essential to distributive mixing.

2. Isolate fluctuation out

Experiments and theories show that, for continuous compounding equipment, "the contents in the mixer melting zone are expected to be quite heterogeneous with respect to the rate of mixing because the polymer blends at various locations have been subjected to a different residence time and different thermal as well as deformational histories. Consequently, at a given cross-sectional area perpendicular to the flow direction, one may expect to find regions with differing morphologies and the continuous phase compositions changing at different rates" (Ref. To: Chi-Kai Shih, DuPont Company, Inc., Wilmington, Del., ANTEC 1991 Conference proceedings, p99). Tube tip is especially designed to solve this problem.

In tube tip, screw channel (the region between adjacent flights) become gradually shallower and shallower because of the outwardly diverging construction of the tip toward its end. The blinding out of the screw channel actually creates a barrier between the screw channel and the die. So that all of the heterogeneous of the contents in crew channel will not directly leave out the screw. The radial oriented spatial distribution means 76 lead melts from different spots of screw channel meet together in axial oriented stream combination in hollow interior portion means 78. Now, no matter what were their past "experiences", no matter how different they were in screw channel, in tube section they are forced to mix together in the conical shaped stream combination means 78 from all directions. Intensive streamline disturbances, surface renewal and position inter-change actions have been created. A homogenized extrudate is expected at the end of tube tip.

(3) Another thing happened during this flowing in and flowing out action is that the flow streams have changed their flow directions twice at 90° angle, which is the optimum angle for distributive mixing (Ref. to: Z. Tadmor, C. G. Gogos, "Principles of Polymer Processing", J. Wiley and Sons, NY, 1978).

Figure 8:
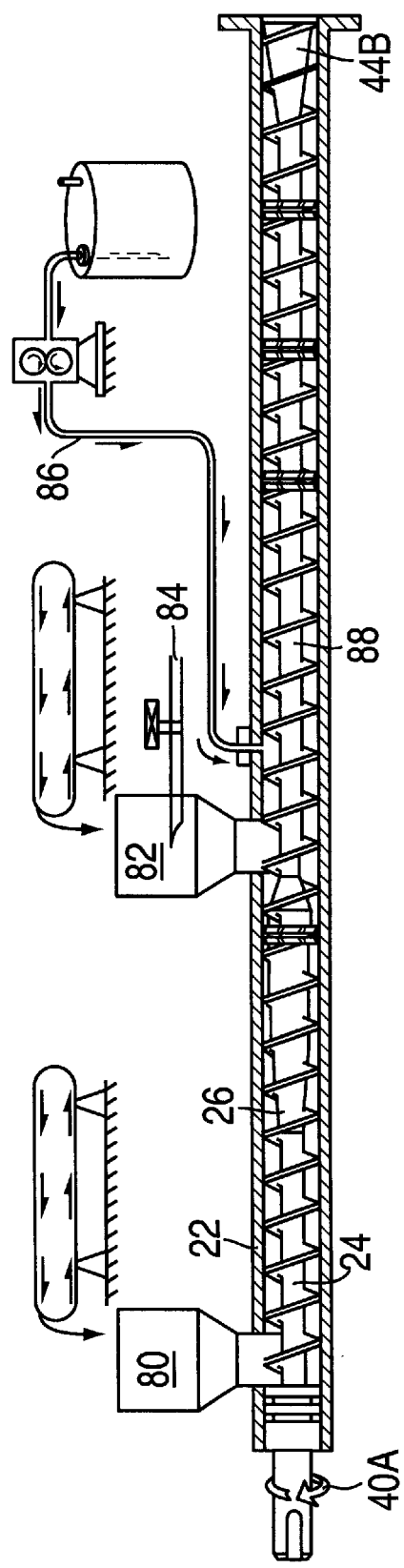

FIG. 8 shows a possible sample layout on down stream feeding compounding extrusion. The first ring unit will be installed at the end of metering section. Right after that ring unit is a reverse tapered zone. At the end of this tapered zone is the feeding throat; which could be a gas or liquid injection tube out let, or a side bulk feeding device, or a hopper with a inert gas blanket, etc . . . At this location a deep screw channel is essential, since we need the screw channel to be partially filled with plastic melt in that area. For example, we may need up to 80% of the screw channel empty for bulk dry material feeding. The key here is deep channel, high screw rotating speed and starving metered feeding—not only for accurate down load also avoid flooding on that feeding throat.

Figure 9B:
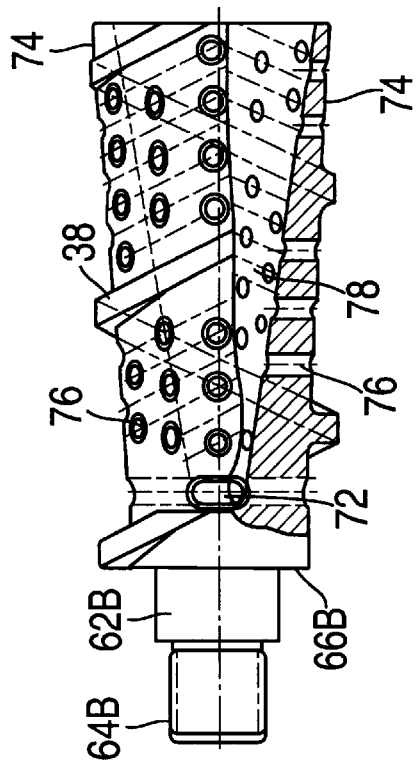
Figure 9A:
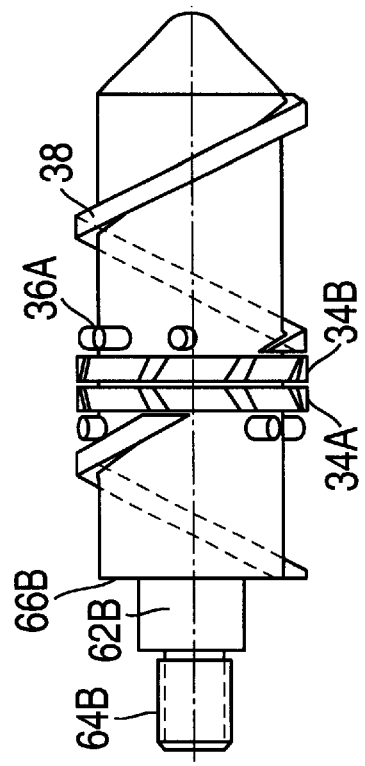

FIGS. 9A and 9B showing designs on ring tip and tube tip elements. Recent years the interchangeable screw mixing elements have become popular. The selling point of SRS tip elements is to fill that part of market—for customers currently using screw element and looking for better element. The beauty of this approach is its convenience and adaptability. For example, the compounder has a job change of switching from dry filler to liquid additive, what he need to do is changing a dispersive mixing shear ring element (FIG. 9A) to a distributive mixing tube element (FIG. 9B), since liquid has no yield point and dispersing is not needed but spatial distribution is essential.

Although the description above contains many specifities, these should not be construed as limiting the scope of the invention but as merely providing illustrations of some of the presently preferred embodiments of this invention. For example, screw channel depths in different sections could vary depend on specific requirements; material of rings and posts could be made of wear resistant steel or other kind of metal, depend on individual needs; ring flow through means 50A and 50B could be cut on a curved shape instead of straight; or could be cut as a series of angled round holes instead of one side opening slots; or could be made radial tilted to interchange the materials from inner house of the screw to outer house of screw and vise versa; etc . . . .

Thus the scope of the invention should be determined by the appended claims and their legal equivalents, rather than by the examples given.

While the preferred embodiment of the invention has been described in detail, modification and adaptions may be made therefor without departing from the spirit and scope of the invention, as delineated in the following claims.

I claim:

1. A screw for use in machinery, said screw comprising:
   a substantially elongate screw body having a surrounding flight thereof;
   a feeding portion for forwarding fed materials from the feeding portion toward an output portion; and
   at least one of a shear ring or tube tip, said shear ring pivotally seating on said screw body and rotatable relative to said screw body, wherein said shear ring is self-driven by said fed materials.

2. The screw of claim 1, wherein said shear ring is made of two ring halves, wherein the ring halves can be installed without disassembling of the screw.

3. The screw of claim 2 further comprising a ring position limitation members built on said screw body to slidably restrain said shear rings on pre-determined positions of the screw.

4. The screw of claim 1, wherein said ring position limitation members comprise a groove made on the screw body in predetermined position, wherein half of said shear ring can be installed and slidably restrained in such predetermined screw axis position.

5. The screw of claim 1, further comprising a plurality of posts built in rows surrounding said screw body on predetermined screw axis position.

6. The screw of claim 1, further comprising:

a tip section, having a tube shape;

wherein said flight is arranged to have gradually shallowed screw channel toward the end of the tip; and wherein the interior of said tube shaped tip section has a conical shape, with a larger opening of the cone being on the open end of the tip.

7. The screw of claim 6, wherein said tube has a plurality of holes radially oriented and uniformly distributed on the wall of the tube connecting outside and inside of the tube, wherein flow stream in screw channel can be divided into a plurality of streams and then combined to one stream.

8. The screw of claim 6, wherein the tip is made hollow inside with one end open and one end closed, with the open end toward the output portion, a plurality of radially oriented holes connecting the inside and outside of said tube wherein flow stream in screw channel will be divided and recombined before it enters the output portion.

9. The screw of claim 8, wherein the outside of said tip has a conical shape going from a smaller to a larger open end diameter, wherein the larger open end diameter forms a gradually increased resistant barrier in the screw channel, wherein contents in the screw channel will be positively forced to flow into inside of the hollowed screw tip.

10. The screw of claim 1, wherein said shearing ring has flow through ports which are angled with respect to the screw axis.

11. The screw of claim 1, wherein said shear ring is generally annular in shape and having inner and outer surface and flow through ports thereon, wherein material can flow through said ports from upstream of said ring to downstream thereof.

12. A method of improving performance in polymer extrusion and injection molding, said method comprising the steps of:

providing a screw having a feeding section;

conveying material from the feeding portion toward the output portion;

providing at least one rotatable shear ring rotatably seated on slots cut in flight of the screw, each shear ring having a plurality of ports permitting materials to pass through, wherein flowing energy urges the ring to rotate around the screw axis;

controlling shearing level by choosing rings with proper rotating directions;

choosing rings according to a desired position for placement along the screw, said rings having proper angles on said pass through ports;

choosing rings having proper thickness; and providing a tip section to further homogenize and easily convey polymer as a flow of essential molten material to the die or nozzle to make final products.

13. The method of claim 12, wherein said shear rings are interchangeable in different combinations to perform different functions.

14. The method of claim 12, wherein the ring position limitation means is a plurality of radially disposed posts mounted normal to and circumferential around the screw.

15. A method according to claim 12, further including a series of rows radialy extended posts from the screw root surface working conjunctive with said rings supplying stretching action to the system, whereby the elongation stress generated by said stretching action will break filler agglomerate in an efficient way without excessive heat generated, so as to avoid undesired degradation.

16. A method according to claim 12, wherein said tip section is tube shaped with through holes on the wall of said tube, whereby enhancing the said homogenizing process.

17. A method according to claim 12, wherein the said screw has a decompression section for residence time adjustment and down stream feeding.

18. The method according to claim 12, wherein said shear rings have groove means on shearing surfaces, supplying grinding actions on fiber orientation, dry filler agglomerate break down.

* * * * *